United States Patent
Yamamoto

(10) Patent No.: US 8,655,064 B2
(45) Date of Patent: Feb. 18, 2014

(54) IMAGE COMPRESSION CIRCUIT FOR COMPRESSING PIECES OF IMAGE DATA OF FOUR ADJACENT PIXELS, IMAGE COMPRESSION METHOD, SEMICONDUCTOR DEVICE, AND SMARTPHONE

(75) Inventor: Takateru Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 47 days.

(21) Appl. No.: 13/524,157

(22) Filed: Jun. 15, 2012

(65) Prior Publication Data

US 2012/0321182 A1  Dec. 20, 2012

(30) Foreign Application Priority Data

Jun. 17, 2011 (JP) .................................. 2011-135219
Aug. 31, 2011 (JP) .................................. 2011-188389
May 22, 2012 (JP) .................................. 2012-116523

(51) Int. Cl.
*G06K 9/00* (2006.01)

(52) U.S. Cl.
USPC ........... 382/166; 382/234; 382/235; 382/243; 345/555

(58) Field of Classification Search
USPC .................... 382/266, 234, 235, 243; 345/555
See application file for complete search history.

(56) References Cited

U.S. PATENT DOCUMENTS

| | | | | |
|---|---|---|---|---|
| 7,881,878 B2* | 2/2011 | Burrus et al. | .................. | 702/28 |
| 7,916,951 B2* | 3/2011 | Landwehr et al. | ............. | 382/224 |
| 7,947,931 B2* | 5/2011 | Finley et al. | .................. | 219/494 |
| 8,046,313 B2* | 10/2011 | Hoffberg et al. | ................. | 706/14 |
| 8,165,916 B2* | 4/2012 | Hoffberg et al. | ............ | 705/14.53 |
| 2011/0002551 A1 | 1/2011 | Fukuma | | |

FOREIGN PATENT DOCUMENTS

JP  2011-015139  1/2011

* cited by examiner

*Primary Examiner* — Yosef Kassa
(74) *Attorney, Agent, or Firm* — Fish & Richardson P.C.

(57) ABSTRACT

An image compression circuit 1 of the invention includes an image calculator 11, a compression-system decision unit 12, and a compression processor 13. Compression-system decision unit 12 determines a variation of pieces of image data of four adjacent pixels based on a variation in luminance Y of the pixels or variations in luminance Y and saturation S of the pixels, compresses the image data into image data of one or two pixels (RGB 888 and RGB 787) expressed by an RGB color space having a small quantization error in the case of the small variation of the pieces of image data, and compresses the image data into data including the luminances of the four adjacent pixels and pieces of image data of two pixels (YCbCr 422) expressed by a YCbCr color space having a large quantization error in the case of the large variation of the pieces of image data.

29 Claims, 11 Drawing Sheets

IMAGE COMPRESSION CIRCUIT FOR
COMPRESSING PIECES OF IMAGE DATA OF
FOUR ADJACENT PIXELS, IMAGE
COMPRESSION METHOD,
SEMICONDUCTOR DEVICE, AND
SMARTPHONE

BACKGROUND OF THE INVENTION

1. Field of the Invention

The present invention relates to an image compression circuit, an image compression method, a semiconductor device, and a smartphone, particularly to an image compression circuit for compressing pieces of image data of four adjacent pixels, an image compression method, a semiconductor device, and a smartphone.

2. Description of the Related Art

Recently, in a display device, an amount of information on image data to be processed increases with increasing resolution of an image, and sometimes image processing of comparing the image data of a preceding frame and the image data of a current frame is performed in order to improve image quality of a moving image. Therefore, in order to perform the image processing of comparing the image data of the preceding frame and the image data of the current frame, it is necessary that a display driver that displays the image on the display device include a memory in which the image data of the preceding frame can be stored.

However, with increasing resolution of the image, the amount of information on the image data of one frame increases, and a capacity of the memory of the display driver is enlarged. In the case that there is a restriction to a chip size of the display driver, the capacity of the memory of the display driver cannot be ensured, and the image data of one frame cannot be stored.

Therefore, in order to store the image data of one frame in the memory, the display driver includes an image compression circuit that compresses the image data. In the image compression circuit, the image data is compressed such that the image data of each pixel expressed by an RGB color space is converted into the image data of each pixel expressed by a YCbCr color space. The image compression circuit can also be used as an image processing device for a game machine in addition to the display driver. For example, in an image processing device disclosed in Japanese Patent Laying-Open No. 2011-15139, an image compression circuit compresses the image data stored in a sprite pattern memory in the case of overlay display in which a sprite image, such as a game character, is superimposed on a background image.

However, unfortunately the image quality of the compressed image data is degraded when the image compression circuit simply compresses the image data by converting the image data of each pixel expressed by the RGB color space into the image data of each pixel expressed by the YCbCr color space.

In the image compression circuit, there is also a problem in that a compression rate of the image data is lowered to increase the information amount of the compressed image data when the degradation of the image quality of the compressed image data is suppressed.

SUMMARY OF THE INVENTION

An object of the invention is to provide an image compression circuit, an image compression method, a semiconductor device, and a smartphone, in which the degradation of the image quality of the compressed image data can be suppressed without reducing the compression rate of the image data.

In an image compression circuit or an image compression method according to an aspect of the invention, a luminance of each pixel is calculated from said image data of each pixel expressed by an RGB color space, and a first RGB compression system compressing said image data of each pixel expressed by the RGB color space is decided on when a variation in luminance of all the pixels falls within a predetermined range based on the luminance of each pixel, which is calculated by an image calculator. In the image compression circuit or the image compression method according to one aspect of the present invention, a second RGB compression system, which differs from the first RGB compression system and compresses the image data of each pixel expressed by the RGB color space, is decided on when the variation in luminance of all the pixels does not fall within the predetermined range, and when the variation in luminance of the pixel included in a group falls within the predetermined range in each of two groups into which each pixel is divided based on the luminance of each pixel, and a YCbCr compression system is decided on when the variation in luminance of the pixel included in the group does not fall within the predetermined range in at least one of the two divided groups. In the image compression circuit or the image compression method according to one aspect of the present invention, the image data is compressed into image data of one pixel expressed by the RGB color space based on the decided system for the first RGB compression system, the image data is compressed into image data of one pixel expressed by the RGB color space in each of the groups for the second RGB compression system, and the image data is compressed into data including the luminances of the four pixels and image data of one pixel expressed by a YCbCr color space in each of the groups for the YCbCr compression system.

In an image compression circuit or an image compression method according to another aspect of the invention, a luminance and a saturation of each pixel are calculated from the image data of each pixel expressed by an RGB color space, and a first RGB compression system compressing the image data of each pixel expressed by the RGB color space is decided on when variations in luminance and saturation of all the pixels fall within a predetermined range based on the luminance and the saturation of each pixel, which are calculated by an image calculator. In the image compression circuit or the image compression method according to another aspect of the present invention, a second RGB compression system, which differs from the first RGB compression system and compresses the image data of each pixel expressed by the RGB color space, is decided on when the variations in luminance and saturation of all the pixels do not fall within the predetermined range, and when the variation in luminance and saturation of the pixel included in a group falls within the predetermined range in each of two groups into which each pixel is divided based on the saturation of each pixel, and a YCbCr compression system is decided on when the variations in luminance and saturation of the pixel included in the group do not fall within the predetermined range in at least one of the two divided groups. In the image compression circuit or the image compression method according to another aspect of the present invention, the image data is compressed into image data of one pixel expressed by the RGB color space based on the decided system for the first RGB compression system, the image data is compressed into image data of one pixel expressed by the RGB color space in each of the groups for the second RGB compression system, and the image data is compressed into data including the luminances of the four pixels and image data of one pixel expressed by a YCbCr color space in each of the groups for the YCbCr compression system.

According to the invention, the variation of the pieces of image data of the four adjacent pixels is determined based on the variation in luminance of the pixels or the variations in luminance and saturation of the pixels, the image data is compressed into the image data of one or two pixels expressed by the RGB color space having the small quantization error in the case of the small variation of the pieces of image data of the four adjacent pixels, and the image data is compressed into the data including the luminances of the four pixels and the pieces of image data of the two pixels expressed by the YCbCr color space having the large quantization error in the case of the large variation of the pieces of image data of the four adjacent pixels. Therefore, the degradation of the image quality of the compressed image data can be suppressed without lowering the compression rate of the image data.

A semiconductor device according to a still another aspect of the invention includes the image compression circuit of the invention. Therefore, the degradation of the image quality of the compressed image data can be suppressed without reducing the compression rate of the image data, and the capacity of the memory circuit can be reduced to achieve the downsizing even in the configuration in which the image data having the desired image quality is processed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the invention will be described with reference to the drawings.

First Embodiment

Figure 1:
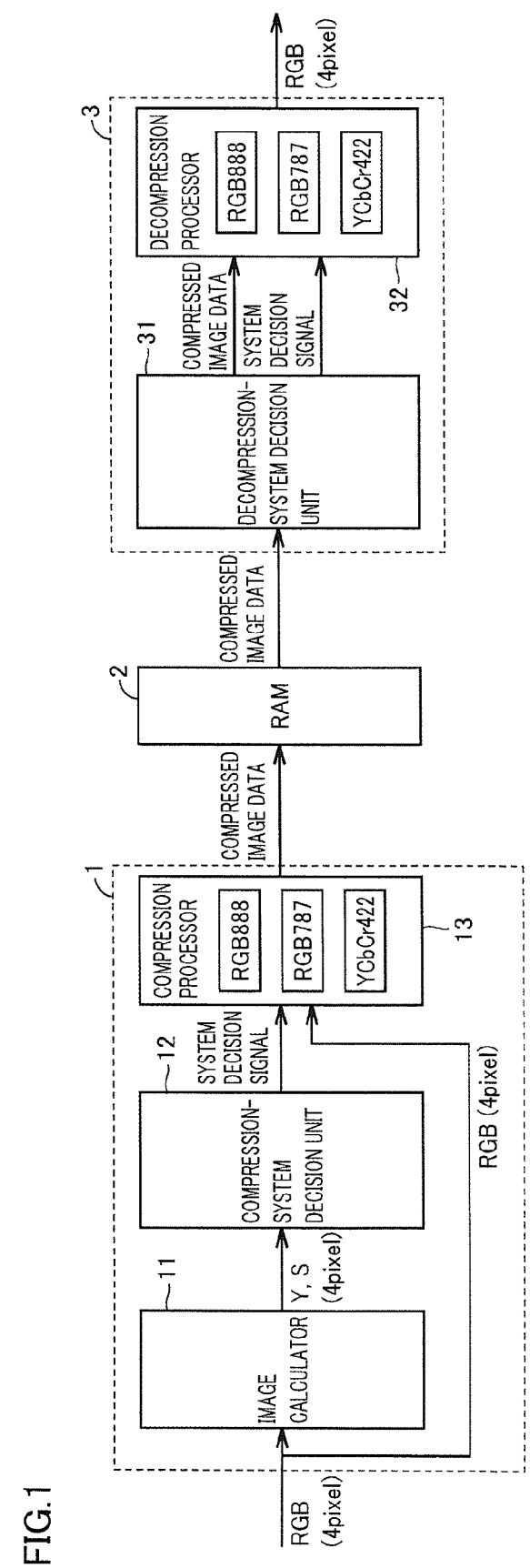
FIG. 1 is a block diagram illustrating a configuration of an image compression circuit according to a first embodiment of the invention.

FIG. 1 is a block diagram illustrating a configuration of an image compression circuit according to a first embodiment of the invention. An image compression circuit 1 of the first embodiment in FIG. 1 compresses pieces of image data of four adjacent pixels. Examples of the four adjacent pixels include four pixels that are arrayed in a 2-by-2 matrix form and four pixels that are consecutively arrayed in a row direction. In the following embodiments, the four adjacent pixels are described as the four pixels that are arrayed in the 2-by-2 matrix form.

In addition to image compression circuit 1, FIG. 1 also illustrates a memory (RAM: Random Access Memory) 2 in which the compressed image data compressed by image compression circuit 1 is stored and an image decompression circuit 3 that takes out the compressed image data stored in memory 2 and decompresses the taken-out compressed image data. Image compression circuit 1 and image decompression circuit 3 may be configured by software as a program executed by a calculation circuit, such as a CPU (Central Processing Unit), or hardware in which logic circuits are combined.

Image compression circuit 1 includes an image calculator 11, a compression-system decision unit 12, and a compression processor 13. Image calculator 11 calculates a luminance Y of each pixel from four-pixel image data expressed by an RGB color space. Specifically, assuming that the image data includes color components of red (RED), green (GREEN), and blue (BLUE), luminance Y can be calculated using a conversion equation given by the following equation 1.

$$Y = (0.29891 \times RED) + (0.58661 \times GREEN) + (0.11448 \times BLUE) \quad \text{(equation 1)}$$

The conversion equation given by equation 1 is decided on by a standard (ITU-R601) of ITU (International Telecommunication Union). Each of luminance Y and the color components of red (RED), green (GREEN), and blue (BLUE) is expressed by a numerical value of a 256-level gray scale ranging from "0" to "255". The image data is a black image in the case that the numerical value of each of red (RED), green (GREEN), and blue (BLUE) is "0". In addition, the image data is a white image in the case that the numerical value of each of red (RED), green (GREEN), and blue (BLUE) is "255".

Compression-system decision unit 12 determines a compression system based on luminance Y of each pixel, which is calculated by image calculator 11.

Specifically, compression-system decision unit 12 decides on a system that compresses the image data expressed by the RGB color space having a small quantization error in the case of a small variation in luminance Y of each pixel, and compression-system decision unit 12 decides on a system that compresses the image data expressed by a YCbCr color space having a large quantization error in the case of a large variation in luminance Y of each pixel. Examples of the system that compresses the image data expressed by the RGB color space include a system (RGB 888 (first RGB compression system)) in which the four-pixel image data expressed by the RGB color space is compressed into image data of one pixel expressed by the RGB color space and a system (RGB 787 (second RGB compression system)) in which the four-pixel image data expressed by the RGB color space is compressed into image data of one pixel expressed by the RGB color space in each of two groups. A system (YCbCr 422 (YCbCr compression system)), in which the image data expressed by the YCbCr color space is compressed into data including a four-pixel luminance and image data of one pixel expressed by the YCbCr color space in each of two groups, is cited as an example of the system that compresses the image data expressed by the YCbCr color space.

Figure 2:
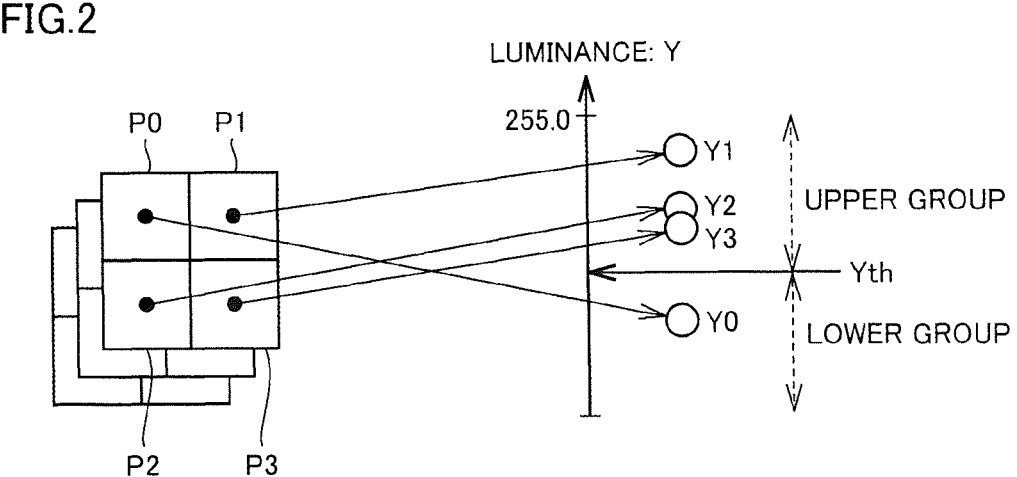
FIG. 2 is a schematic diagram illustrating processing in which a compression-system decision unit of the image compression circuit of the first embodiment divides each pixel into two groups.

Compression-system decision unit 12 decides on RGB 888 as the compression system when the variation in luminance of all the pixels falls within a first range. Compression-system decision unit 12 divides each pixel into two groups based on the luminance of each pixel when the variation in luminance of all the pixels does not fall within a first range. FIG. 2 is a schematic diagram illustrating processing in which compression-system decision unit 12 of image compression circuit 1 of the first embodiment divides each pixel into two groups. Image calculator 11 calculates luminances Y0 to Y3 of pixels P0 to P3 in FIG. 2. As illustrated in FIG. 2, using an average value of calculated luminances Y0 to Y3 as a threshold Yth, compression-system decision unit 12 divides luminances Y0 to Y3 into an upper group (luminances Y1 to Y3) and a lower group (luminance Y0), whereby pixels P1 to P3 are sorted into the upper group while pixel P0 is sorted into lower group.

Compression-system decision unit 12 decides on RGB 787 as the compression system when the variation in luminance of the pixel included in the group falls within a second range in each of the two divided groups, and decides on YCbCr 422 as the compression system when the variation in luminance of the pixel included in the group does not fall within a second range in at least one of the two divided groups. At this point, the first range may be identical to or different from the second range.

Figure 3:
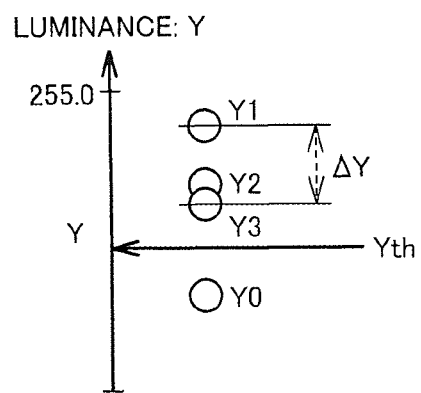
FIG. 3 is a schematic diagram illustrating processing in which the compression-system decision unit of the image compression circuit of the first embodiment determines a variation in luminance of the pixel included in the group.

FIG. 3 is a schematic diagram illustrating processing in which compression-system decision unit 12 of image compression circuit 1 of the first embodiment determines the variation in luminance of the pixel included in the group. Compression-system decision unit 12 determines whether the upper group in FIG. 3 includes luminances Y1 to Y3 of pixels P1 to P3 and determines whether a variation (for example, standard deviation) $\Delta Y$ in luminances Y1 to Y3 falls within the second range. Compression-system decision unit 12 does not determine the variation in the lower group because the lower group includes only luminance Y0 of pixel P0. On the other hand, when the lower group includes plural luminances Y, compression-system decision unit 12 makes the same determination as the upper group.

Based on the system decided on by compression-system decision unit 12, compression processor 13 compresses the image data into the compressed image data using one of compression systems RGB 888, RGB 787, and YCbCr 422. In YCbCr 422, the image data is compressed into the data (4:2:2-format data) including the luminances of the four pixels and the image data of one pixel expressed by the YCbCr color space in each group.

In RGB 888, the four-pixel image data expressed by the RGB color space is compressed into image data of one pixel expressed by the RGB color space. For example, when each of the color components of red (RED), green (GREEN), and blue (BLUE) has 8 bits, 8 bits×3 color components×4 pixels=96 bits are required for the four-pixel image data expressed by the RGB color space. However, in the case of the small variation in luminance Y of the four pixels (a standard deviation falls within the first range), each of the pieces of image data of the four pixels can be determined as the similar image. Therefore, in RGB 888, the four pixel image data is represented by the one-pixel image data, thereby compressing the 96-bit four-pixel image data into the 24-bit one-pixel image data. Examples of a method for calculating the image data of the representative pixel include the case that the image data of one of the four pixels is used, the case that the image data of the pixel having maximum or minimum luminance Y is used, the case that an average value of luminances Y of the four pixels is used, or the case that a value calculated with a difference value or the standard deviation is used.

In RGB 888, compression information (4 bits) necessary to compress and decompress the image data is added to the 24-bit one-pixel image data. The compression information includes pair information Smap (3 bits) indicating a combination of pixels included in each group and selection information (1 bit) selecting the compression system. The selection information indicates which the image data expressed by the RGB color space or the image data expressed by the YCbCr color space is compressed. For example, the selection information indicates "0" in the case that the image data expressed by the RGB color space is compressed, and indicates "1" in the case that the image data expressed by the YCbCr color space is compressed.

Figure 4:
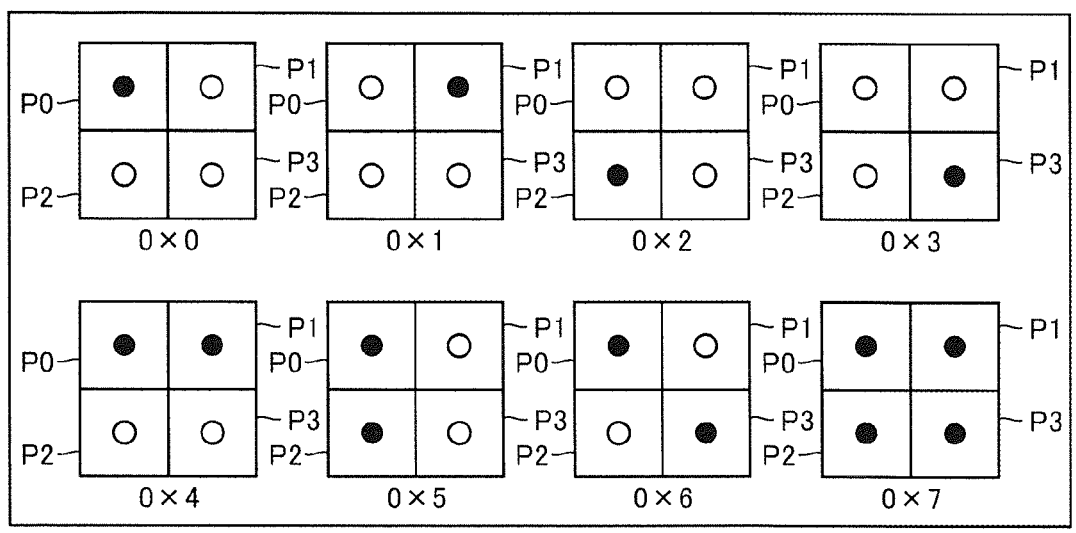
FIG. 4 is a schematic diagram illustrating pair information Smap.

The pair information Smap indicates a combination of the pixel included in the upper group and the pixel included in the lower group. FIG. 4 is a schematic diagram illustrating the pair information Smap. In the pair information Smap in FIG. 4, the combination of pixel P0 included in the upper group and pixels P1 to P3 included in the lower group or the combination of pixels P1 to P3 included in the upper group and pixel P0 included in the lower group is designated as "0x0".

Similarly, in the pair information Smap in FIG. 4, the combination of pixel P1 included in the upper group and pixels P0, P2, and P3 included in the lower group or the combination of pixels P0, P2, and P3 included in the upper group and pixel P1 included in the lower group is designated as "0x1". In the pair information Smap in FIG. 4, the combination of pixel P2 included in the upper group and pixels P0, P1, and P3 included in the lower group or the combination of pixels P0, P1, and P3 included in the upper group and pixel P2 included in the lower group is designated as "0x2". In the pair information Smap in FIG. 4, the combination of pixel P3 included in the upper group and pixels P0 to P2 included in the lower group or the combination of pixels P0 to P2 included in the upper group and pixel P3 included in the lower group is designated as "0x3".

In the pair information Smap in FIG. 4, the combination of pixels P0 and P1 included in the upper group and pixels P2 and P3 included in the lower group or the combination of pixels P2 and P3 included in the upper group and pixels P0 and P1 included in the lower group is designated as "0x4". In the pair information Smap in FIG. 4, the combination of pixels P0 and P2 included in the upper group and pixels P1 and P3 included in the lower group or the combination of pixels P1 and P3 included in the upper group and pixels P0 and P2 included in the lower group is designated as "0x5". In the pair information Smap in FIG. 4, the combination of pixels P0 and P3 included in the upper group and pixels P1 and P2 included in the lower group or the combination of pixels P1 and P2 included in the upper group and pixels P0 and P3 included in the lower group is designated as "0x6".

In the pair information Smap in FIG. 4, the case that the four pixels are not divided into the groups is designated as "0x7". Therefore, the pair information Smap is set to "0x7" because RGB 888 is the case that the four pixels are not divided into the groups, the pair information Smap is set to "0x7", and the selection information is set to "0" because the image data expressed by the RGB color space is compressed.

In RGB 888, 20-bit dummy bit (additional bit added to match the number of bits with the number of bits of the data compressed using RGB 787 or YCbCr 422) is added to the 24-bit one-pixel image data and the 4-bit compression information in order to match a compression rate with a compression rate (for example set to ½) of RGB 787 or YCbCr 422 (in order to match the number of bits with the number of bits of RGB 787 or YCbCr 422. Therefore, in RGB 888, the 96-bit four-pixel image data is compressed into the 48-bit compressed image data.

Figure 11:
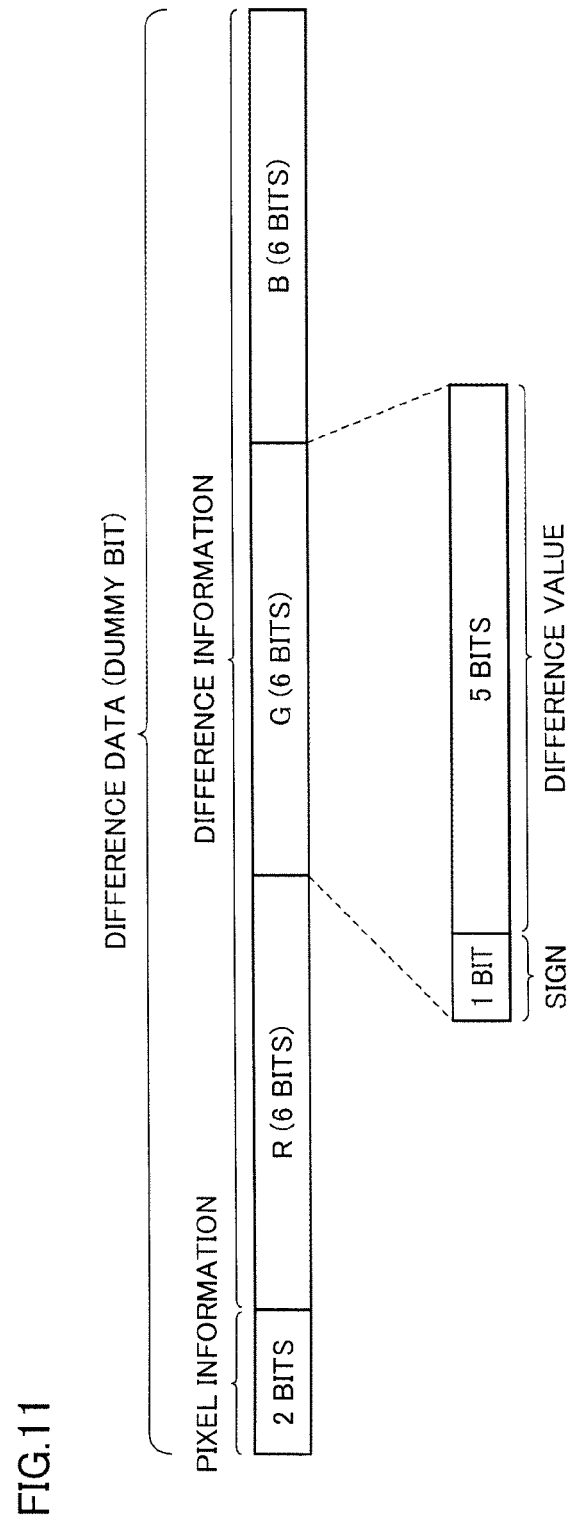
FIG. 11 is a schematic diagram illustrating information allocated to a dummy bit when the image compression circuit of the first embodiment compresses the image data using RGB 888.

At this point, information on "0" or "1" may simply be allocated to the 20-bit dummy bit, or difference data from the image data included in the data to be compressed may be allocated to the 20-bit dummy bit. Specifically, the case that the image data of the pixel having the largest difference value from the image data included in the data to be compressed is allocated to the dummy bit will specifically be described. FIG. 11 is a schematic diagram illustrating information allocated to the dummy bit when the image compression circuit of the first embodiment compresses the image data using RGB 888. The difference data of the pixel having the largest difference value from the image data included in the data to be compressed is allocated to the dummy bit in FIG. 11. The difference data includes pixel information (2 bits) indicating which pixel is allocated and difference information (18 bits) indicating a difference value in each color component of the allocated pixel.

The 2-bit pixel information "00" is allocated to the dummy bit when pixel P0 is the pixel having the largest difference value, the 2-bit pixel information "01" is allocated to the dummy bit when pixel P1 is the pixel having the largest difference value, the 2-bit pixel information "10" is allocated to the dummy bit when pixel P2 is the pixel having the largest difference value, the 2-bit pixel information "11" is allocated to the dummy bit when pixel P3 is the pixel having the largest difference value. The difference information includes difference information (6 bits) of each of the color components of red (RED), green (GREEN), and blue (BLUE) of the pixel having the largest difference value. The difference information (6 bits) of each of the color components includes a difference value (5 bits) indicating an absolute value of a difference from the image data and a sign (1 bit) of the difference value.

Thus, the image data of the pixel having the color component most different from the image data included in the data to be compressed can be included in the data to be compressed by allocating the difference data of the pixel having the largest different value from the image data included in the data to be compressed to the dummy bit. Therefore, the allocation of the difference data of the pixel to the dummy bit improves the image quality compared with the case that the image data is simply compressed using RGB 888. An amount of data to be compressed does not increase because the bit to which the difference data of the pixel is allocated is the dummy bit.

Figure 12:
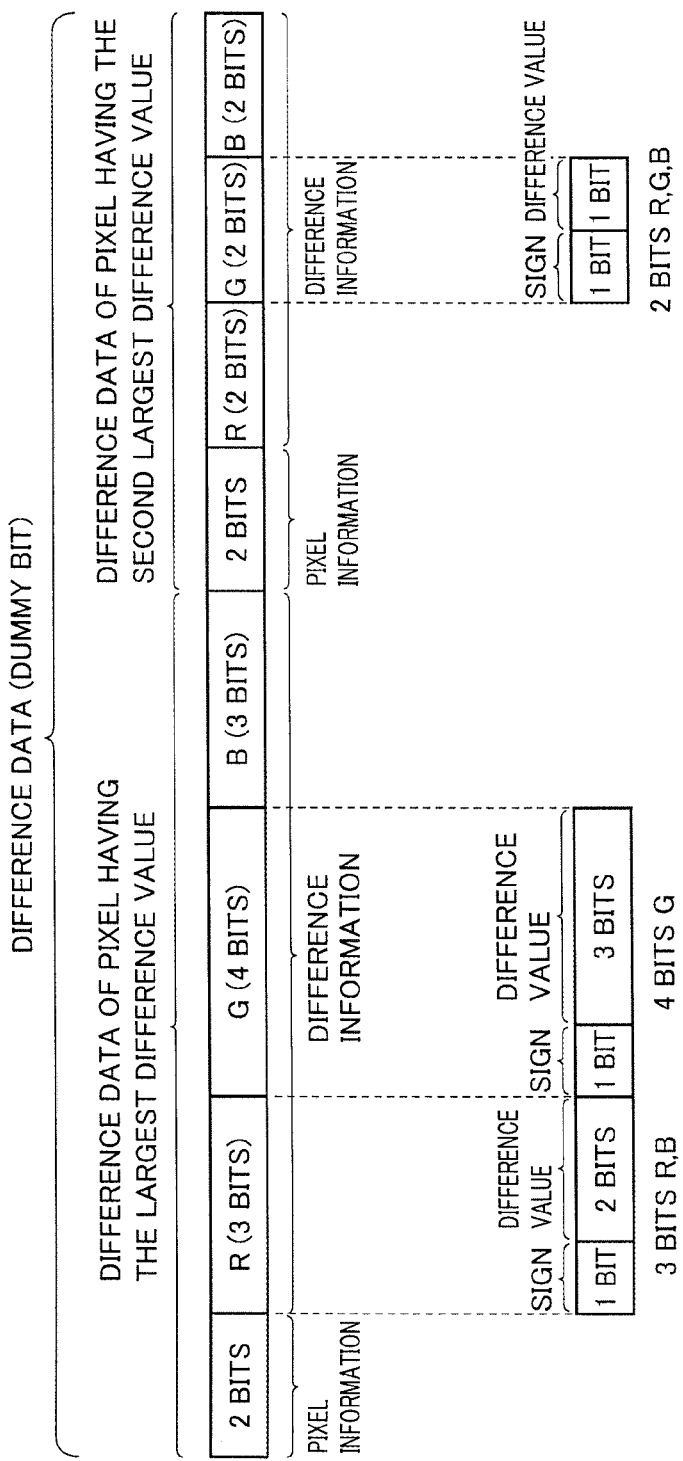
FIG. 12 is a schematic diagram illustrating another piece of information allocated to the dummy bit when the image compression circuit of the first embodiment compresses the image data using RGB 888.

The difference data of the pixel, which is allocated to the dummy bit, is not limited only to the difference data of the pixel having the largest difference value from the image data. FIG. 12 is a schematic diagram illustrating another piece of information allocated to the dummy bit when the image compression circuit of the first embodiment compresses the image data using RGB 888. The two pieces of difference data of the pixels having the larger difference values from the image data included in the data to be compressed are allocated to the dummy bit in FIG. 12. Specifically, the difference data (12 bits) of the pixel having the largest difference value from the image data included in the data to be compressed and the difference data (8 bits) of the pixel having the second largest difference value are allocated to the dummy bit.

The difference data (12 bits) of the pixel having the largest difference value includes the pixel information (2 bits) and the difference information (3 bits+4 bits+3 bits=10 bits) on each of the color components red (RED), green (GREEN), and blue (BLUE). The difference data (8 bits) of the pixel having the second largest difference value includes the pixel information (2 bits) and the difference information (2 bits+2 bits+2 bits=6 bits) on each of the color components of red (RED), green (GREEN), and blue (BLUE). The number of bits is described only by way of example in the difference information on each of the color components of red (RED), green (GREEN), and blue (BLUE). The image quality of the compressed image data is improved when the number of bits of the difference information on the color component green of (GREEN), for which human eyes are sensitive, is increased compared with the numbers of bits of the pieces of difference information on the other color components.

The difference information on each of the 3-bit color components of red (RED) and blue (BLUE) includes the difference value (2 bits) and the sign (1 bit) of the difference value. The difference information on the 4-bit color component green (GREEN) includes the difference value (3 bits) and the sign (1 bit) of the difference value. The difference information on each of the 2-bit color components of red (RED), green (GREEN), and blue (BLUE) includes the difference value (1 bit) and the sign (1 bit) of the difference value.

In RGB 787, the four-pixel image data expressed by the RGB color space is compressed into the image data of one pixel, which is included in the upper group and expressed by the RGB color space, and the image data of one pixel, which is included in the lower group and expressed by the RGB color space. When the variation in luminance Y of the pixels included in the upper group and the lower group is small (the standard deviation falls within the second range) while the variation in luminance Y of the four pixels is large (the standard deviation is out of the first range), each of the pieces of image data of the pixels in each group can be determined as the similar image. Therefore, in RGB 787, the four-pixel image data is represented by the image data of one pixel included in the upper group and the image data of one pixel included in the lower group, thereby compressing the 96-bit four-pixel image data into the 48-bit two-pixel image data. Examples of a method for calculating the image data of the pixel representing the upper group or the lower group include the case that the image data of the pixel having maximum or minimum luminance Y is used, the case that the average value of luminances Y of the pixels is used, and the case that value calculated with the difference value or the standard deviation is used.

For example, in RGB 787, when the three pixels are included in the upper group or the lower group, the pixel having median luminance Y is calculated as the image data of the pixel representing the group. In RGB 787, luminances Y of the three pixels are arrayed in the ascending or descending order, and the average value (the minimum value or the maximum value may be used) of the pieces of data of the two pixels having the smaller difference values is calculated as the image data of the pixel representing the group. In RGB 787, luminances Y of the three pixels are arrayed in the ascending or descending order, and the average value of the pieces data of the three pixels is calculated as the image data of the pixel representing the group when the standard deviation of luminances Y of the two pixels having the smaller difference values is greater than or equal to a predetermined value. In RGB 787, the image data of the pixel representing the group may be calculated by different methods for the upper group and the lower group.

However, even in RGB 787, it is necessary to add the compression information (4 bits) necessary to compress and decompress the image data to the 48-bit two-pixel image data. For the compression rate of ½ in RGB 787, the compression information (4 bits) cannot be added when the 96-bit four-pixel image data is simply compressed into the 48-bit two-pixel image data. Therefore, in RGB 787, in the color components of red (RED), green (GREEN), and blue (BLUE), the number of bits indicating each of the color components red (RED) and blue (BLUE) except the color component green (GREEN) for which the human eyes are sensitive is decreased from 8 bits to 7 bits, whereby the compression rate of ½ is ensured even if the compression information (4 bits) is added.

That is, in RGB 787, 96-bit four-pixel image data is compressed into the 44-bit ((the one-pixel image data (22 bits) having the color component of red (RED)=7 bits, the color component of green (GREEN)=8 bits, and the color component of blue (BLUE)=7 bits)×2) two-pixel image data.

Similarly to RGB 888, the compression information includes the pair information Smap (3 bits) indicating the combination of the pixels included in each group and the selection information (1 bit) selecting the compression system.

In YCbCr 422, the four-pixel image data expressed by the RGB color space is compressed into the data including luminances Y of the four pixels, the image data (color difference) of one pixel, which is included in the upper group and expressed by the YCbCr color space, and the image data (color difference) of one pixel, which is included in the lower group and expressed by the YCbCr color space. When the variation in luminance Y of the four pixels is large (the standard deviation is out of the first range) while the variation in luminance Y of the pixels included in the upper group and the lower group is also large in at least one of the upper group and the lower group (the standard deviation is out of the second range), each of the pieces of image data of the four pixels cannot be determined as the similar image. Therefore, in YCbCr 422, the four-pixel image data is represented by luminances Y (6 bits×4) of the four pixels, the image data (color difference: Cb=5 bits and Cr=5 bits) of one pixel included in the upper group, and the image data (color difference: Cb=5 bits and Cr=5 bits) of one pixel included in the lower group, thereby compressing the 96-bit four-pixel image data into the 44-bit image data.

At this point, compression processor 13 can calculate the conversion of the image data expressed by the RGB color space into the image data expressed by the YCbCr color space using a conversion equation given by the following equation 2.

$$Y=(0.29891 \times RED)+(0.58661 \times GREEN)+(0.11448 \times BLUE)$$

$$Cb=(-0.1688 \times RED)+(-0.3312 \times GREEN)+(0.50 \times BLUE)$$

$$Cr=(0.50 \times RED)+(-0.4184 \times GREEN)+(-0.0816 \times BLUE) \quad \text{(equation 2)}$$

The conversion equation given by equation 2 is decided on by the standard (ITU-R601) of ITU. Each of luminance Y and the color components red (RED), green (GREEN), and blue (BLUE) is expressed by the numerical value of the 256-level gray scale ranging from "0" to "255". The image data is the black image in the case that the numerical value of each of red (RED), green (GREEN), and blue (BLUE) is "0". In addition, the image data is the white image in the case that the numerical value of each of red (RED), green (GREEN), and blue (BLUE) is "255".

Even in YCbCr 422, it is necessary to add the compression information (4 bits) necessary to compress and decompress the image data to the 44-bit image data. Therefore, in YCbCr 422, the compression rate is set to ½. Similarly to RGB 888, the compression information includes the pair information Smap (3 bits) indicating the combination of the pixels included in each group and the selection information (1 bit) selecting the compression system.

In YCbCr 422, examples of a method for calculating the color difference of the pixel representing the upper group or the lower group include the case that the color difference of the pixel having a maximum or minimum saturation S is used, the case that an average value of the color differences of the pixels is used, or the case that the value calculated with the difference value or the standard deviation is used.

For example, in YCbCr 422, when the three pixels are included in the upper group or the lower group, the pixel having median saturation S is calculated as the color difference of the pixel representing the group. In YCbCr 422, saturations S of the three pixels are arrayed in the ascending or descending order, and the average value (the minimum value or the maximum value may be used) of the pieces data of the two pixels having the smaller difference values is calculated as the color difference of the pixel representing the group. In YCbCr 422, saturations S of the three pixels are arrayed in the ascending or descending order, and the average value of the color differences of the three pixels is calculated as the color difference of the pixel representing the group when the standard deviation of saturations S of the two pixels having the smaller difference values is greater than or equal to a predetermined value. In YCbCr 422, the color difference of the pixel representing the group may be calculated by different methods for the upper group and the lower group.

Referring to FIG. 1, the compressed image data compressed by image compression circuit 1 is stored in memory 2. Any memory, such as a DRAM (Dynamic Random Access Memory) and an SRAM (Static Random Access Memory), is used as memory 2 as long as the compressed image data can be stored.

Image decompression circuit 3 includes a decompression-system decision unit 31 and a decompression processor 32. Decompression-system decision unit 31 takes out the compressed image data from memory 2, determines the compression system of the taken-out compressed image data based on the compression information, and decides on a decompression system corresponding to the compression system. Decompression-system decision unit 31 outputs a system decision signal including information on the decided decompression system and the compressed image data to decompression processor 32.

Based on the system decision signal output from decompression-system decision unit 31, decompression processor 32 decompresses the compressed image data into the four-pixel image data expressed by the RGB color space using one of the decompression systems RGB 888, RGB 787, and YCbCr 422.

Figure 5:
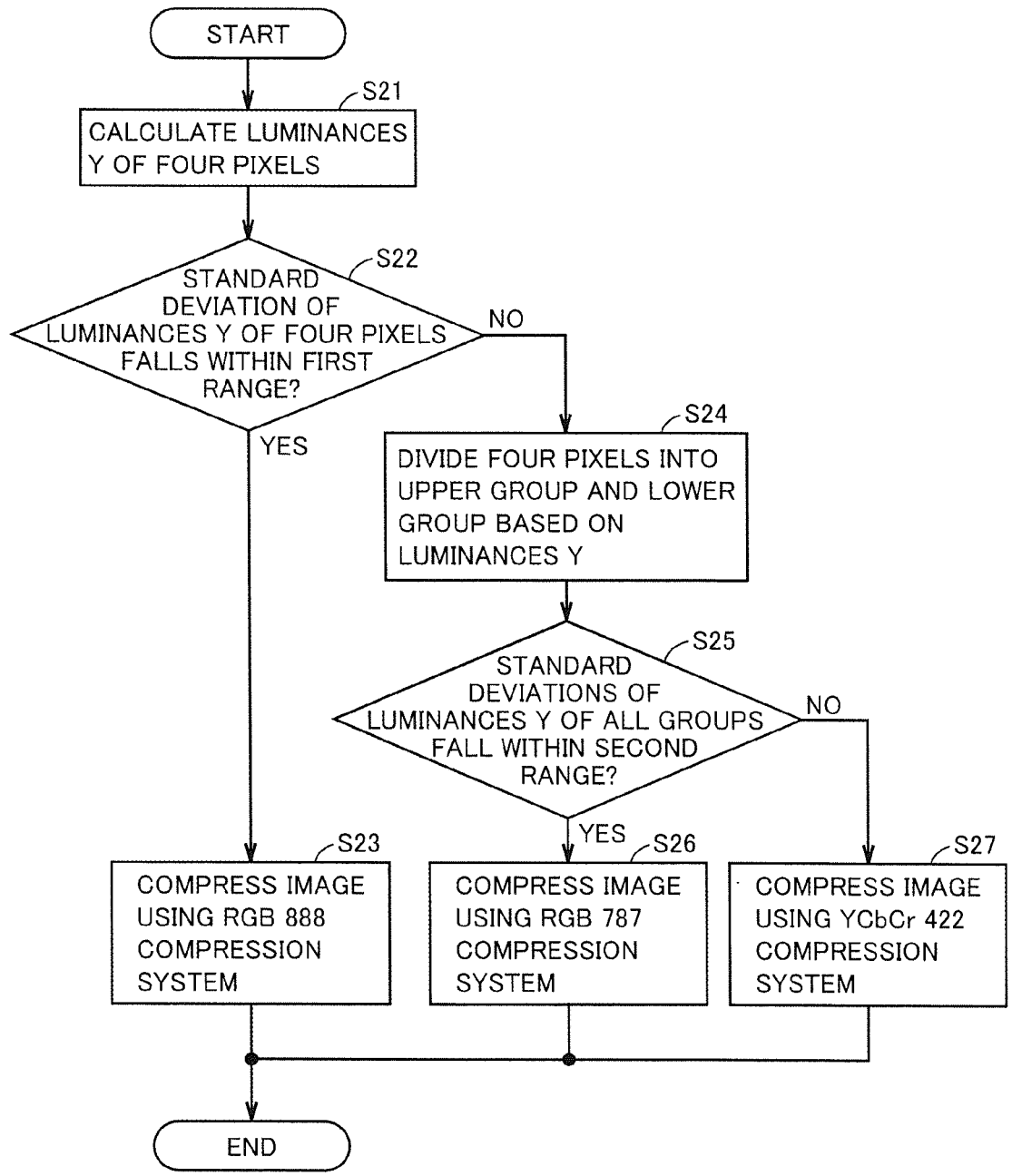
FIG. 5 is a flowchart illustrating an operation of the image compression circuit of the first embodiment.

An operation of image compression circuit 1 of the first embodiment will be described below. FIG. 5 is a flowchart illustrating the operation of image compression circuit 1 of the first embodiment. Image calculator 11 calculates luminance Y of each pixel from the four-pixel image data expressed by the RGB color space (Step S21).

Compression-system decision unit 12 calculates the standard deviation of luminances Y of four pixels, which are calculated by image calculator 11, and determines whether the calculated standard deviation falls within the first range (Step S22). When the calculated standard deviation falls within the first range (YES in Step S22), compression-system decision unit 12 decides on RGB 888 as the compression system. Compression processor 13 compresses the image data into the compressed image data using RGB 888 according to the system decided on by compression-system decision unit 12 (Step S23).

When the calculated standard deviation does not fall within the first range (NO in Step S22), compression-system decision unit 12 divides the image data into the upper group and the lower group based on luminance Y (Step S24). As illustrated in FIG. 2, compression-system decision unit 12 sorts luminance Y, which is greater than or equal to threshold Yth in luminances Y of the four pixels, into the upper group, and sorts luminance Y less than threshold Yth into the lower group.

Compression-system decision unit 12 calculates the standard deviation of luminances Y in each group, and determines whether the standard deviations of luminances Y of all the groups fall within the second range (Step S25). When the standard deviations of luminances Y of all the groups fall within the second range (YES in Step S25), compression-system decision unit 12 decides RGB 787 as the compression system. Compression processor 13 compresses the image data into the compressed image data using RGB 787 according to the system decided on by compression-system decision unit 12 (Step S26).

When the standard deviations of luminances Y of all the groups do not fall within the second range (NO in Step S25), compression-system decision unit 12 decides YCbCr 422 as the compression system. Compression processor 13 compresses the image data into the compressed image data using YCbCr 422 according to the system decided on by compression-system decision unit 12 (Step S27).

As described above, image compression circuit 1 of the first embodiment determines the variation of the pieces of image data of the four adjacent pixels based on the variation in luminance Y of the pixels, compresses the image data into the image data of one or two pixels expressed by the RGB color space having the small quantization error in the case of the small variation of the pieces of image data of the four adjacent pixels, and compresses the image data into the data including the luminances of the four pixels and the pieces of image data of the two pixels expressed by the YCbCr color space having the large quantization error in the case of the large variation of the pieces of image data of the four adjacent pixels. Therefore, the degradation of the image quality of the compressed image data can be suppressed without lowering the compression rate of the image data.

Compression-system decision unit 12 of the first embodiment is not limited to one that divides luminances Y of the pixels into the upper group and the lower group using the average value (threshold Yth) of luminances Y of the four pixels. Alternatively, luminances Y of the pixels are arrayed in the ascending or descending order, and luminances Y of the pixels may be divided into the upper group and the lower group using a largest difference value between luminances Y. For example, in the case that the pixels have luminances Y of "10", "20", "100", and "120", the difference values of "10", "80", and "20" are obtained. Therefore, luminances Y of the pixels are divided into the upper group and the lower group using the difference value between luminance Y of "20" and luminance Y of "100". Compression-system decision unit 12 may divide luminances Y of the pixels into the upper group and the lower group using the average value of luminances Y in the case that the standard deviation of luminances Y of the pixels is less than a predetermined value, and compression-system decision unit 12 may divide luminances Y of the pixels into the upper group and the lower group using the difference value in the case that the standard deviation of luminances Y of the pixels is greater than or equal to the predetermined value.

Second Embodiment

Figure 6:
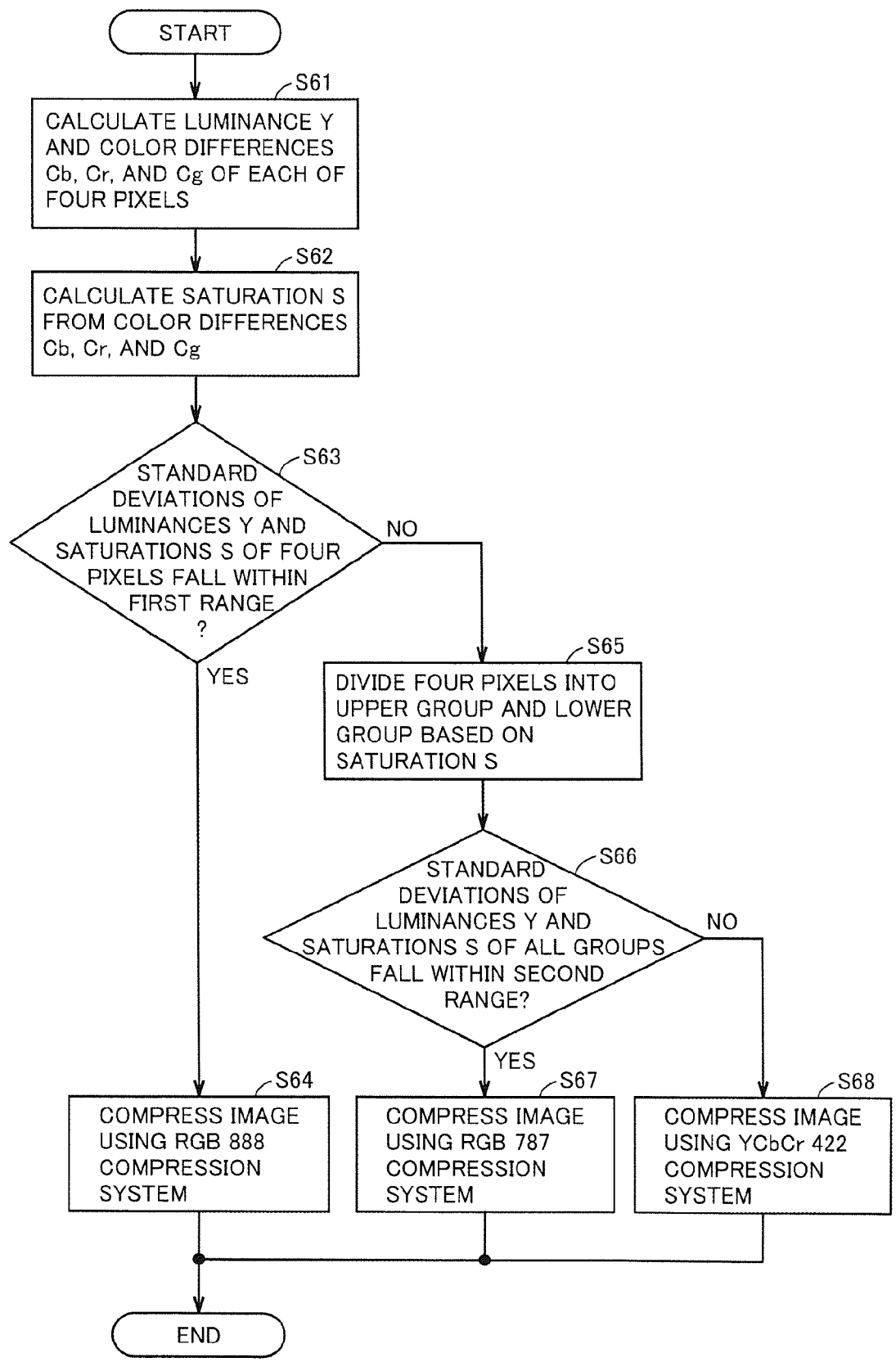
FIG. 6 is a flowchart illustrating an operation of an image compression circuit according to a second embodiment of the invention.

Because a configuration of an image compression circuit according to a second embodiment of the invention is identical to that of image compression circuit 1 of the first embodiment in FIG. 1, the detailed description thereof is not repeated. In the following description, each component of the image compression circuit of the second embodiment is designated by the same reference as image compression circuit 1 of the first embodiment. FIG. 6 is a flowchart illustrating an operation of an image compression circuit 1 according to a second embodiment of the invention.

Image calculator 11 calculates luminance Y and color differences Cb, Cr, and Cg of each pixel from four-pixel image data expressed by the RGB color space (Step S61). Specifically, assuming that red (RED), green (GREEN), and blue (BLUE) are the color components of the image data, luminance Y can be calculated using the conversion equation given by equation 1, and color differences Cb, Cr, and Cg can be calculated using the conversion equation given by equation 3.

$$Cb=(-0.1688\times RED)+(-0.3312\times GREEN)+(0.50\times BLUE)$$

$$Cr=(0.50\times RED)+(-0.4184\times GREEN)+(-0.0816\times BLUE)$$

$$Cg=(-0.3615\times RED)+(0.50\times GREEN)+(-0.1385\times BLUE) \quad \text{(equation 3)}$$

The conversion equations given by equations 1 and 3 are decided on by the standard (ITU-R601) of ITU. Each of luminance Y and the color components of red (RED), green (GREEN), and blue (BLUE) is expressed by the numerical value of the 256-level gray scale ranging from "0" to "255". The image data is the black image in the case that the numerical value of each of red (RED), green (GREEN), and blue (BLUE) is "0", and the image data is the white image in the case that the numerical value of each of red (RED), green (GREEN), and blue (BLUE) is "255".

Image calculator 11 calculates saturation S from calculated color differences Cb, Cr, and Cg (Step S62). Specifically, saturation S can be calculated using a conversion equation given by an equation 4. Saturation S is expressed by numerical values of "0" to "186.47".

$$S=\sqrt{Cb^2+Cr^2+Cg^2} \quad \text{(equation 4)}$$

Compression-system decision unit 12 calculates the standard deviations of luminances Y and saturations S of the four pixels, which are calculated by image calculator 11, and determines whether each of the calculated standard deviations falls within the first range (Step S63). When each of the calculated standard deviations falls within the first range (YES in Step S63), compression-system decision unit 12 decides on RGB 888 as the compression system. Compression processor 13 compresses the image data into the compressed image data using RGB 888 according to the system decided on by compression-system decision unit 12 (Step S64).

Figure 7:
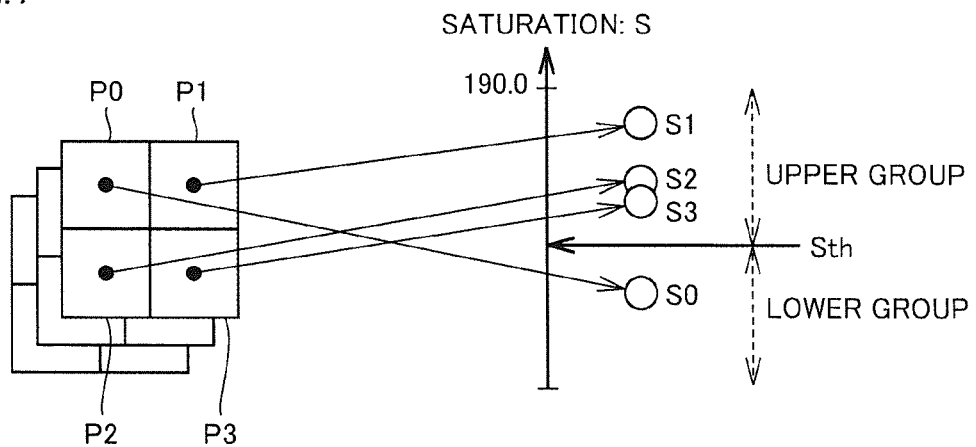
FIG. 7 is a schematic diagram illustrating processing in which the compression-system decision unit of the image compression circuit of the second embodiment divides each pixel into two groups.

When each of the calculated standard deviations does not fall within the first range (NO in Step S63), compression-system decision unit 12 divides the pixels into the upper group and the lower group based on saturation S (Step S65). FIG. 7 is a schematic diagram illustrating processing in which a compression-system decision unit 12 of image compression circuit 1 of the second embodiment divides each pixel into two groups. Image calculator 11 calculates saturations S0 to S3 of pixels P0 to P3 in FIG. 7. As illustrated in FIG. 7, compression-system decision unit 12 divides saturations S0 to S3 into the upper group (saturations S1 to S3) and the lower group (saturation S0) with the calculated average value of saturations S0 to S3 as threshold Sth, whereby pixels P1 to P3 are sorted into the upper group while pixel P0 is sorted into lower group.

Figure 8:
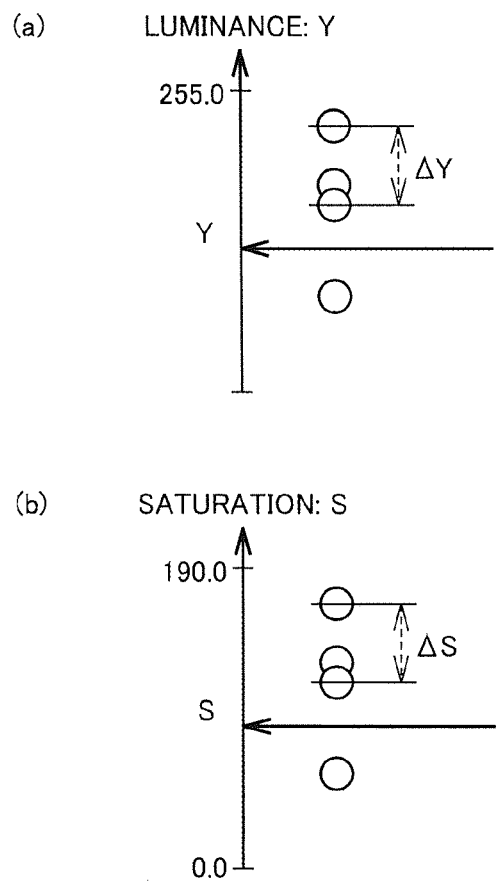
FIG. 8 is a schematic diagram illustrating processing in which the compression-system decision unit of the image compression circuit of the second embodiment determines variations in luminance and saturation of the pixel included in the group.

Compression-system decision unit 12 calculates the standard deviations of luminances Y and saturations S in each group, and determines whether the standard deviations of luminances Y and saturations S of all the groups fall within the second range (Step S66). FIG. 8 is a schematic diagram illustrating processing in which compression-system decision unit 12 of image compression circuit 1 of the second embodiment determines the variations in luminance and saturation of the pixel included in the group. FIG. 8(a) is a view in which luminances Y0 to Y3 of pixels P0 to P3 are plotted, and FIG. 8(b) is a view in which saturations S0 to S3 of pixels P0 to P3 are plotted.

The upper group in FIG. 8(a) includes luminances Y1 to Y3 of pixels P1 to P3, and compression-system decision unit 12 determines whether variation (for example, standard deviation) ΔY of luminances Y1 to Y3 falls within the second range. Compression-system decision unit 12 does not determine the variation in the lower group because the lower group includes only luminance Y0 of pixel P0. On the other hand, when the lower group includes plural luminances Y, compression-system decision unit 12 makes the same determination as the upper group.

The upper group in FIG. 8(b) includes saturations S1 to S3 of pixels P1 to P3, and compression-system decision unit 12 determines whether a variation (for example, standard deviation) ΔS of saturations S1 to S3 falls within the second range. Compression-system decision unit 12 does not determine the variation in the lower group because the lower group includes only saturation S0 of pixel P0. On the other hand, when the lower group includes plural saturations S, compression-system decision unit 12 makes the same determination as the upper group.

Referring to FIG. 6, when the standard deviations of luminances Y and saturations S of all the groups fall within the second range (YES in Step S66), compression-system decision unit 12 decides on RGB 787 as the compression system. Compression processor 13 compresses the image data into the compressed image data using RGB 787 according to the system decided on by compression-system decision unit 12 (Step S67).

When the standard deviations of luminances Y and saturations S of all the groups do not fall within the second range (NO in Step S66), compression-system decision unit 12 decides on YCbCr 422 as the compression system. Compression processor 13 compresses the image data into the compressed image data using YCbCr 422 according to the system decided on by compression-system decision unit 12 (Step S68).

Figure 9:
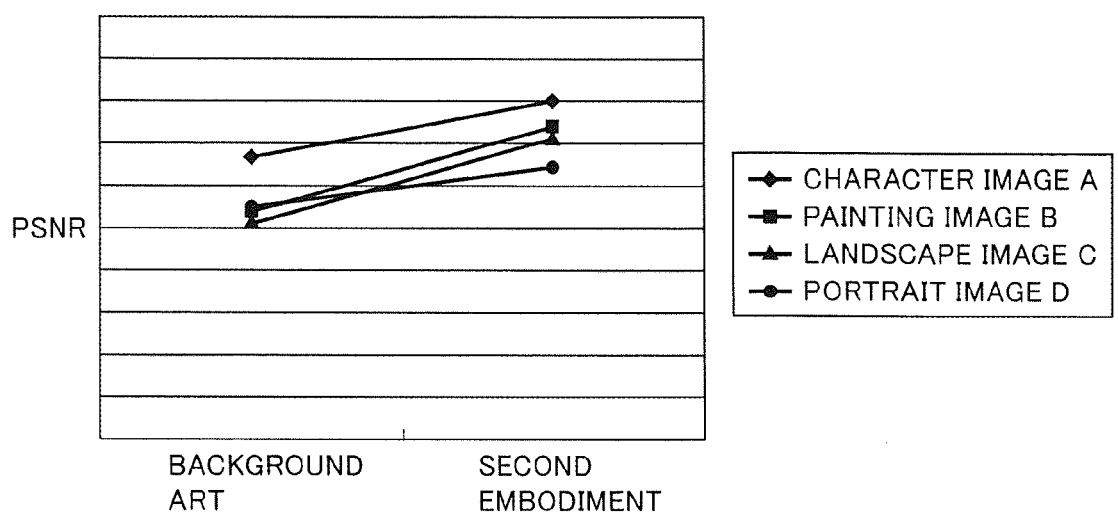
FIG. 9 is a view illustrating a result obtained by evaluating image quality of compressed image data compressed by the image compression circuit of the second embodiment.

FIG. 9 is a view illustrating a result obtained by evaluating image quality of the compressed image data compressed by image compression circuit 1 of the second embodiment. A vertical axis in FIG. 9 is a PSNR (Peak Signal to Noise Ratio) value indicating evaluation of the image quality. Although the PSNR value is expressed by a unit of decibel [dB], the unit is not displayed in FIG. 9 because only arbitrary range including an evaluated result is cut out. A horizontal axis in FIG. 9 indicates the image quality (background art) of the compressed image data, in which the image data of each pixel expressed by the RGB color space is simply converted and compressed into the image data of each pixel expressed by the YCbCr color space, and the image quality of the compressed image data compressed by image compression circuit 1 of the second embodiment.

FIG. 9 illustrates an evaluation result of the image quality of each of a character image A in which characters of several colors are displayed on a white background, a painting image B in which a painting is drawn in multiple colors, a landscape image C in which an image of a landscape is captured by a digital camera, and a portrait image D in which an image of a person is captured by the digital camera. For character image A, the image quality of the compressed image data compressed by image compression circuit 1 of the second embodiment is improved in the PSNR value compared with the background art. For painting image B and landscape image C, the image quality of the compressed image data compressed by image compression circuit 1 of the second embodiment is improved in the PSNR value compared with the background art, and an improvement level of the PSNR value is better than that of character image A. For portrait image D, the image quality of the compressed image data compressed by image compression circuit 1 of the second embodiment is improved in the PSNR value compared with the background art, and the improvement level of the PSNR value is identical to that of character image A.

As described above, image compression circuit 1 of the second embodiment determines the variation of the pieces of image data of the four adjacent pixels based on the variations in luminance Y and saturation S of the pixels, compresses the image data into the image data of one or two pixels expressed by the RGB color space having the small quantization error in the case of the small variation of the pieces of image data of the four adjacent pixels, and compresses the image data into the data including the luminances of the four pixels and the pieces of image data of the two pixels expressed by the YCbCr color space having the large quantization error in the case of the large variation of the pieces of image data of the four adjacent pixels. Therefore, the degradation of the image quality of the compressed image data can be suppressed without lowering the compression rate of the image data.

Compression-system decision unit 12 of the second embodiment is not limited to one that divides luminances Y of the pixels into the upper group and the lower group using the average value (threshold Sth) of saturations S of the four pixels. Alternatively, saturations S of the pixels are arrayed in the ascending or descending order, and saturations S of the pixels may be divided into the upper group and the lower group using a largest difference value between saturations S. For example, in the case that the pixels have saturations S of "10", "20", "100", and "120", the difference values of "10", "80", and "20" are obtained. Therefore, saturations S of the pixels are divided into the upper group and the lower group using the difference value between saturation S of "20" and saturation S of "100". Compression-system decision unit 12 may divide saturations S of the pixels into the upper group and the lower group using the average value of saturations S in the case that the standard deviation of saturations S of the pixels is less than a predetermined value, and compression-system decision unit 12 may divide saturations S of the pixels into the upper group and the lower group using the difference value in the case that the standard deviation of saturations S of the pixels is greater than or equal to the predetermined value.

Third Embodiment

Figure 10:
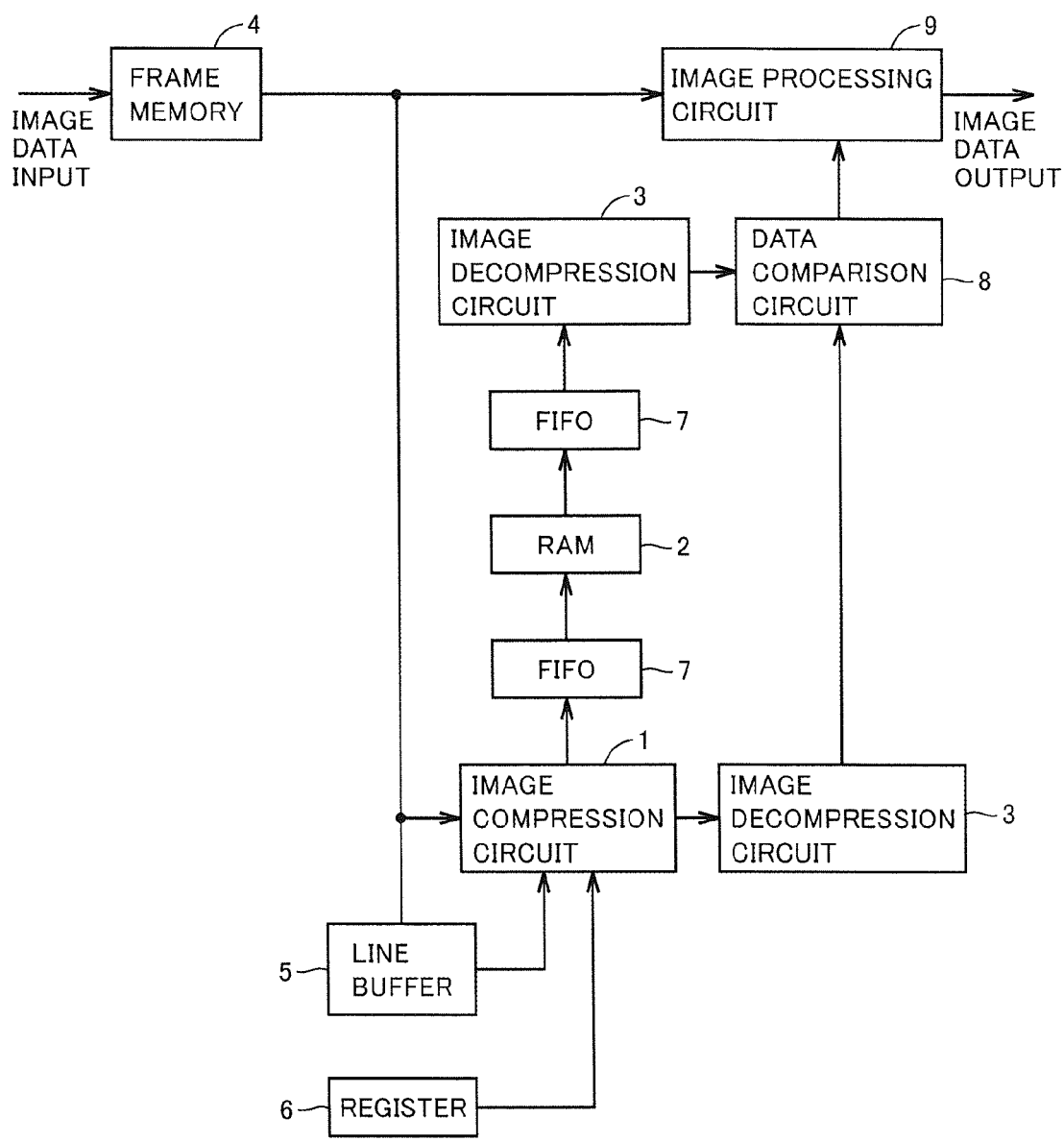
FIG. 10 is a block diagram illustrating a configuration of a semiconductor device according to a third embodiment of the invention.

FIG. 10 is a block diagram illustrating a configuration of a semiconductor device according to a third embodiment of the invention. For example, a semiconductor device 100 in FIG. 10 is a display driver that displays the image on a liquid crystal display device. Semiconductor device 100 includes image compression circuit 1, memory 2, and image decompression circuit 3 of the first or second embodiment. Semiconductor device 100 also includes a frame memory 4, a line buffer 5, a register 6, a FIFO (first-in first-out) circuit 7, a data comparison circuit 8, and an image processing circuit 9.

Frame memory 4 retains the input image data in units of frames. Line buffer 5 temporarily retains the image data, which is processed by image compression circuit 1, in units of lines. Register 6 retains setting information on image compression circuit 1. FIFO circuit 7 stores the compressed image data compressed by image compression circuit 1 in memory 2 in a first-in first-out manner, and takes out the compressed image data stored in memory 2 to image decompression circuit 3 in the first-in first-out manner.

Data comparison circuit 8 compares the image data in which the compressed image data of the preceding frame stored in memory 2 is decompressed by image decompression circuit 3 and the image data in which the compressed image data of the current frame compressed by image compression circuit 1 is decompressed by image decompression circuit 3. Image processing circuit 9 performs predetermined processing to the compressed image data of the current frame based on the comparison result of data comparison circuit 8, and outputs the compressed image data to which the predetermined processing is already performed.

As described above, semiconductor device 100 of the third embodiment includes image compression circuit 1 of the first or second embodiment. Therefore, the degradation of the image quality of the compressed image data can be suppressed without lowering the compression rate of the image data, and a capacity of memory 2 can be reduced to achieve downsizing.

In the third embodiment, semiconductor device 100 includes image decompression circuit 3 and image processing circuit 9. When semiconductor device 100 includes at least image compression circuit 1 of the first or second embodiment and memory 2 in which the compressed image data compressed by image compression circuit 1 is stored, the downsizing can be achieved without enlarging the capacity of memory 2. The same holds true for frame memory 4. Therefore, the downsizing of frame memory 4 can also be achieved.

Application

Image compression circuit 1 of the first or second embodiment and image decompression circuit 3 can be mounted on a type of application with which the image data is dealt. In the case that image compression circuit 1 and image decompression circuit 3 are mounted on the application, image compression circuit 1 and image decompression circuit 3 may be mounted on the application as semiconductor device 100 of the third embodiment, or image compression circuit 1 and image decompression circuit 3 may be mounted on the application by directly incorporating image compression circuit 1 and image decompression circuit 3 in a circuit of the application. Alternatively, image compression circuit 1 may directly be incorporated in the circuit of the application while image decompression circuit 3 is mounted on the application as another IC.

Figure 13:
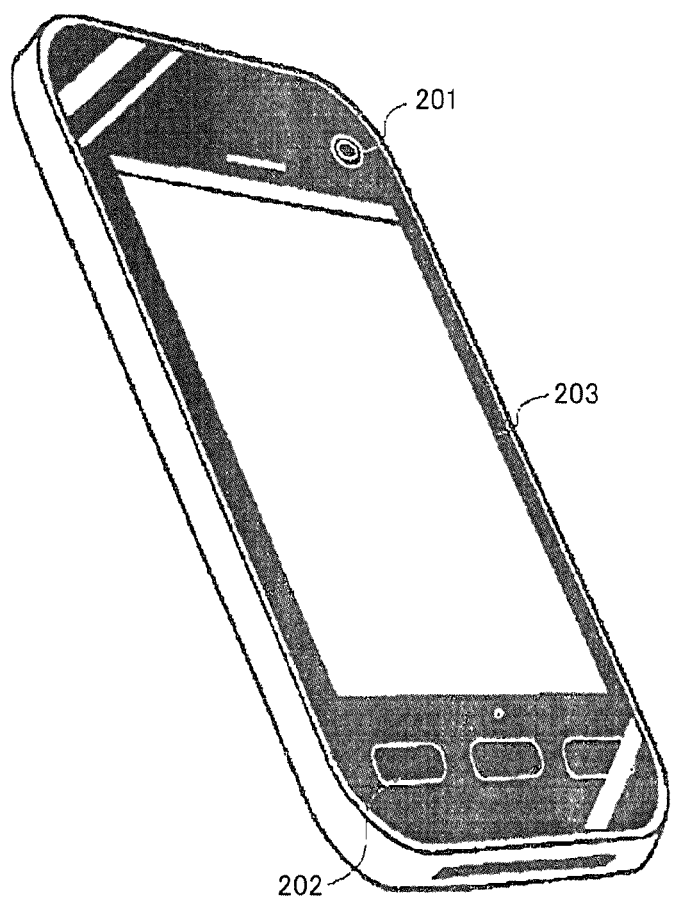
FIG. 13 is an outline view of a mobile information terminal including the image compression circuit of the first or second embodiment.

A mobile information terminal (such as a mobile phone, a smartphone, and a tablet PC) can be cited as an example of the application on which image compression circuit 1 and image decompression circuit 3 are mounted. FIG. 13 is an outline view of a mobile information terminal including image compression circuit 1 and image decompression circuit 3 of the first or second embodiment. A mobile information terminal 200 in FIG. 13 includes an imaging unit 201 that is mounted on a front surface or a back surface of a main body, a manipulation unit 202 (such as various buttons and a touch panel) that receives a user manipulation, and a display 203 that displays the character and the image (such as the captured image and medium playback image). Image compression circuit 1 (not illustrated) included in mobile information terminal 200 performs the above processing to the image data captured by imaging unit 201 to compress the image data. Image decompression circuit 3 included in mobile information terminal 200 performs the above processing to the image data compressed by image compression circuit 1, and decompresses the image data. Because mobile information terminal 200 includes image compression circuit 1, the degradation of the image quality of the compressed image data can be suppressed without lowering the compression rate of the image data, and an amount of data stored in the mounted memory (not illustrated) can be reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image compression circuit that compresses pieces of image data of four adjacent pixels, the image compression circuit comprising:
    an image calculator for calculating a luminance of each pixel from said image data of each pixel expressed by an RGB color space;
    a compression-system decision unit for deciding on a first RGB compression system compressing said image data of each pixel expressed by the RGB color space when a variation in luminance of all the pixels falls within a predetermined range based on the luminance of each pixel, which is calculated by said image calculator, deciding on a second RGB compression system, which differs from said first RGB compression system and compresses said image data of each pixel expressed by the RGB color space, when the variation in luminance of all the pixels does not fall within said predetermined range, and when the variation in luminance of the pixel included in a group falls within said predetermined range in each of two groups into which each pixel is divided based on the luminance of each pixel, and deciding on a YCbCr compression system when the variation in luminance of the pixel included in said group does not fall within said predetermined range in at least one of said two divided groups; and a compression processor for compressing said image data into image data of one pixel expressed by the RGB color space based on the system decided on by said compression-system decision unit for said first RGB compression system, compressing said image data into image data of one pixel expressed by the RGB color space in each of said groups for said second RGB compression system, and compressing said image data into data including the luminances of the four pixels and image data of one pixel expressed by a YCbCr color space in each of said groups for said YCbCr compression system.

2. An image compression circuit that compresses pieces of image data of four adjacent pixels, the image compression circuit comprising:

an image calculator for calculating a luminance and a saturation of each pixel from said image data of each pixel expressed by an RGB color space;

a compression-system decision unit for deciding on a first RGB compression system compressing said image data of each pixel expressed by the RGB color space when variations in luminance and saturation of all the pixels fall within a predetermined range based on the luminance and the saturation of each pixel, which are calculated by said image calculator, deciding on a second RGB compression system, which differs from said first RGB compression system and compresses said image data of each pixel expressed by the RGB color space, when the variations in luminance and saturation of all the pixels do not fall within said predetermined range, and when the variation in luminance and saturation of the pixel included in a group falls within said predetermined range in each of two groups into which each pixel is divided based on the saturation of each pixel, and deciding on a YCbCr compression system when the variations in luminance and saturation of the pixel included in said group do not fall within said predetermined range in at least one of said two divided groups; and a compression processor for compressing said image data into image data of one pixel expressed by the RGB color space based on the system decided on by said compression-system decision unit for said first RGB compression system, compressing said image data into image data of one pixel expressed by the RGB color space in each of said groups for said second RGB compression system, and compressing said image data into data including the luminances of the four pixels and image data of one pixel expressed by a YCbCr color space in each of said groups for said YCbCr compression system.

3. The image compression circuit according to claim 1, wherein said compression-system decision unit divides the pixels into said group including a pixel in which the luminance is greater than or equal to an average value of the luminances of the pixels and said group including a pixel in which the luminance is less than the average value.

4. The image compression circuit according to claim 1, wherein said compression-system decision unit arrays the luminances of the pixels in the ascending or descending order, and divides the luminances into said groups using a largest difference value between the luminances.

5. The image compression circuit according to claim 1, wherein said compression-system decision unit divides the pixels into said group including a pixel in which the luminance is greater than or equal to an average value of the luminances of the pixels and said group including a pixel in which the luminance is less than the average value when a standard deviation of the luminances of the pixels is less than a predetermined value, and said compression-system decision unit arrays the luminances of the pixels in the ascending or descending order, and divides the luminances into said groups using a largest difference value between the luminances when a standard deviation of the luminances of the pixels is greater than or equal to the predetermined value.

6. The image compression circuit according to claim 2, wherein said compression-system decision unit divides the pixels into said group including a pixel in which the saturation is greater than or equal to an average value of the saturations of the pixels and said group including a pixel in which the saturation is less than the average value.

7. The image compression circuit according to claim 2, wherein said compression-system decision unit arrays the saturations of the pixels in the ascending or descending order, and divides the saturations into said groups using a largest difference value between the saturations.

8. The image compression circuit according to claim 2, wherein said compression-system decision unit divides the pixels into said group including a pixel in which the saturation is greater than or equal to an average value of the saturations of the pixels and said group including a pixel in which the saturation is less than the average value when a standard deviation of the saturations of the pixels is less than a predetermined value, and said compression-system decision unit arrays the saturations of the pixels in the ascending or descending order, and divides the saturations into said groups using a largest difference value between the saturations when a standard deviation of the saturations of the pixels is greater than or equal to the predetermined value.

9. The image compression circuit according to claim 1, wherein said first RGB compression system compresses said pieces of image data of the four pixels expressed by the RGB color space into data including said image data of one of the four pixels expressed by the RGB color space and compression information necessary to compress and decompress said image data.

10. The image compression circuit according to claim 1, wherein said first RGB compression system compresses said pieces of image data of the four pixels expressed by the RGB color space into data including an average value, a minimum value, or a maximum value of said pieces of image data of the four pixels expressed by the RGB color space and compression information necessary to compress and decompress said image data.

11. The image compression circuit according to claim 9, wherein said second RGB compression system compresses said pieces of image data of the four pixels expressed by the RGB color space into data including said image data of one of the four pixels expressed by the RGB color space with respect to each of said groups and said compression information.

12. The image compression circuit according to claim 9, wherein said second RGB compression system compresses said pieces of image data of the four pixels expressed by the RGB color space into data including an average value, a minimum value, or a maximum value of said pieces of image data of the pixels expressed by the RGB color space in each of said group and said compression information.

13. The image compression circuit according to claim 9, wherein said second RGB compression system compresses, when said pieces of image data of the four pixels expressed by the RGB color space are divided into a first group including said image data of one pixel and a second group including said pieces of image data of three pixels, said pieces of image data of the four pixels expressed by the RGB color space into data including said image data of the pixel included in said first group, a median of said pieces of image data of the pixels included in said second group, and said compression information.

14. The image compression circuit according to claim 9, wherein said second RGB compression system compresses, when said pieces of image data of the four pixels expressed by the RGB color space are divided into a first group including said image data of one pixel and a second group including said pieces of image data of three pixels, said pieces of image data of the four pixels expressed by the RGB color space into data including said image data of the pixel included in said first group, an average value, a minimum value, or a maximum value of said pieces of image data of two pixels, which have smaller difference values in arraying the pixels included in said second group in the ascending or descending order, and said compression information.

15. The image compression circuit according to claim 9, wherein said second RGB compression system compresses, when said pieces of image data of the four pixels expressed by the RGB color space are divided into a first group including said image data of one pixel and a second group including said pieces of image data of three pixels, said pieces of image data of the four pixels expressed by the RGB color space into data including said image data of the pixel included in said first group, an average value of said pieces of image data of three pixels, in which a standard deviation of the luminances of the two pixels having the smaller difference values is greater than or equal to a predetermined value in arraying the pixels included in said second group in the ascending or descending order, and said compression information.

16. The image compression circuit according to claim 11, wherein said YCbCr compression system compresses said pieces of image data of the four pixels expressed by the RGB color space into data including the luminances of the pixels, a color difference of one pixel with respect to each of said groups, and said compression information.

17. The image compression circuit according to claim 11, wherein said YCbCr compression system compresses said pieces of image data of the four pixels expressed by the RGB color space into data including the luminances of the pixels, an average value, a minimum value, or a maximum value of the color differences of the pixels in each of said groups, and said compression information.

18. The image compression circuit according to claim 13, wherein said YCbCr compression system compresses said pieces of image data of the four pixels expressed by the RGB color space into data including the luminances of the pixels, the color difference of the pixel included in said first group, a median of the color differences of the pixels included in said second group, and said compression information.

19. The image compression circuit according to claim 13, wherein said YCbCr compression system compresses said pieces of image data of the four pixels expressed by the RGB color space into data including the luminances of the pixels, the color difference of the pixel included in said first group, an average value, a minimum value, or a maximum value of the color differences of the two pixels, which have smaller difference values in arraying the pixels included in said second group in the ascending or descending order, and said compression information.

20. The image compression circuit according to claim 13, wherein said YCbCr compression system compresses said pieces of image data of the four pixels expressed by the RGB color space into data including the color difference of the pixel included in said first group, an average value of the color differences of three pixels, in which a standard deviation of the saturations of the two pixels having the smaller difference values is greater than or equal to a predetermined value in arraying the pixels included in said second group in the ascending or descending order, and said compression information.

21. The image compression circuit according to claim 9, wherein said compression information includes pair information indicating a combination of the pixels included in each of said groups and selection information selecting a compression system.

22. The image compression circuit according to claim 1, wherein an amount of information on said image data expressed in each of red and blue is decreased compared with an amount of information on said image data expressed in green in said second RGB compression system.

23. A semiconductor device comprising:
the image compression circuit according to claim 1 for compressing input image data into compressed image data; and
a memory circuit in which said compressed image data compressed by said image compression circuit is stored.

24. An image compression method for compressing pieces of image data of four adjacent pixels, the image compression method comprising:
a first step of calculating a luminance of each pixel from said image data of each pixel expressed by an RGB color space;
a second step of deciding on a first RGB compression system compressing said image data of each pixel expressed by the RGB color space when a variation in luminance of all the pixels falls within a predetermined range based on the calculated luminance of each pixel, deciding on a second RGB compression system, which differs from said first RGB compression system and compresses said image data of each pixel expressed by the RGB color space, when the variation in luminance of all the pixels does not fall within said predetermined range, and when the variation in luminance of the pixel included in a group falls within said predetermined range in each of two groups into which each pixel is divided based on the luminance of each pixel, and deciding on a YCbCr compression system when the variation in luminance of the pixel included in said group does not fall within said predetermined range in at least one of said two divided groups; and
a third step of compressing said image data into image data of one pixel expressed by the RGB color space based on the decided system for said first RGB compression system, compressing said image data into image data of one pixel expressed by the RGB color space in each of said groups for said second RGB compression system, and compressing said image data into data including the luminances of the four pixels and image data of one pixel expressed by a YCbCr color space in each of said groups for said YCbCr compression system.

25. An image compression method for compressing pieces of image data of four adjacent pixels, the image compression method comprising:

a first step of calculating a luminance and a saturation of each pixel from said image data of each pixel expressed by an RGB color space;

a second step of deciding on a first RGB compression system compressing said image data of each pixel expressed by the RGB color space when variations in luminance and saturation of all the pixels fall within a predetermined range based on the calculated luminance and the calculated saturation of each pixel, deciding on a second RGB compression system, which differs from said first RGB compression system and compresses said image data of each pixel expressed by the RGB color space, when the variations in luminance and saturation of all the pixels do not fall within said predetermined range, and when the variation in luminance and saturation of the pixel included in a group falls within said predetermined range in each of two groups into which each pixel is divided based on the saturation of each pixel, and deciding on a YCbCr compression system when the variations in luminance and saturation of the pixel included in said group do not fall within said predetermined range in at least one of said two divided groups; and a third step of compressing said image data into image data of one pixel expressed by the RGB color space based on the decided system for said first RGB compression system, compressing said image data into image data of one pixel expressed by the RGB color space in each of said groups for said second RGB compression system, and compressing said image data into data including the luminances of the four pixels and image data of one pixel expressed by a YCbCr color space in each of said groups for said YCbCr compression system.

26. The image compression circuit according to claim 9, wherein, in said first RGB compression system, difference data of a pixel having a largest difference value from said image data included in data to be compressed is allocated to an additional bit that is added in order to match the number of bits of the data to be compressed with that of the data compressed using said second RGB compression system and said YCbCr compression system.

27. The image compression circuit according to claim 9, wherein, in said first RGB compression system, difference data between two pixels having larger difference values from said image data included in data to be compressed is allocated to an additional bit that is added in order to match the number of bits of the data to be compressed with that of the data compressed using said second RGB compression system and said YCbCr compression system.

28. A smartphone comprising: an imaging unit; a manipulation unit for receiving a user manipulation; a display for displaying an image; and the image compression circuit according to claim 1 for compressing image data captured by said imaging unit.

29. A smartphone comprising: the semiconductor device according to claim 23; and an image decompression circuit for decompressing said compressed image data stored in said memory circuit.

* * * * *